United States Patent [19]
Williams, Jr.

[11] Patent Number: 4,613,149
[45] Date of Patent: Sep. 23, 1986

[54] SELF-COUPLING TRAILER HITCH
[76] Inventor: Thomas M. Williams, Jr., Rte. 8, Box 414, Durham, N.C. 27704
[21] Appl. No.: 699,354
[22] Filed: Feb. 7, 1985

Related U.S. Application Data
[63] Continuation-in-part of Ser. No. 674,524, Nov. 23, 1984, Pat. No. 4,560,184.

[51] Int. Cl.⁴ .............................................. B60D 1/02
[52] U.S. Cl. .................................... 280/508; 280/510; 280/511; 280/477; 280/478 B
[58] Field of Search ............... 280/508, 510, 504, 511, 280/477, 478 R, 478 B

[56]           References Cited
U.S. PATENT DOCUMENTS

| | | | |
|---|---|---|---|
| 2,062,788 | 12/1936 | Jacob | 280/477 |
| 2,671,673 | 3/1954 | Benson | 280/477 |
| 3,161,422 | 12/1964 | Wade | 280/508 |
| 3,329,445 | 7/1967 | Carson | 280/478 B |
| 3,891,237 | 6/1975 | Allen | 280/477 |

*Primary Examiner*—John J. Love
*Assistant Examiner*—Donn McGiehan
*Attorney, Agent, or Firm*—B. B. Olive

[57]             ABSTRACT

An automatic trailer hitch assembly mounts a shank unit on the trailer and a receiving unit on the towing vehicle. The shank unit provides an elongated shank member which mounts a trailer ball at one end coupled to a conventional trailer hitch ball socket housing secured to the trailer and at the opposite end is formed to slide on funnel-like guide passages into the receiving unit. A spring leveler assembly is detachably secured as a subassembly to the trailing end of the shank unit, releasably grasps the ball socket housing and retains the shank unit properly positioned for coupling. The receiving unit has a locking pin which can be latched into a position allowing entry of the shank member into the receiving unit and when the shank unit is properly positioned therein is automatically unlatched and moved into a position for locking the shank unit and receiving unit together. The locking pin can also be restored to a latched position which enables the shank unit to be withdrawn from the receiving unit.

12 Claims, 20 Drawing Figures

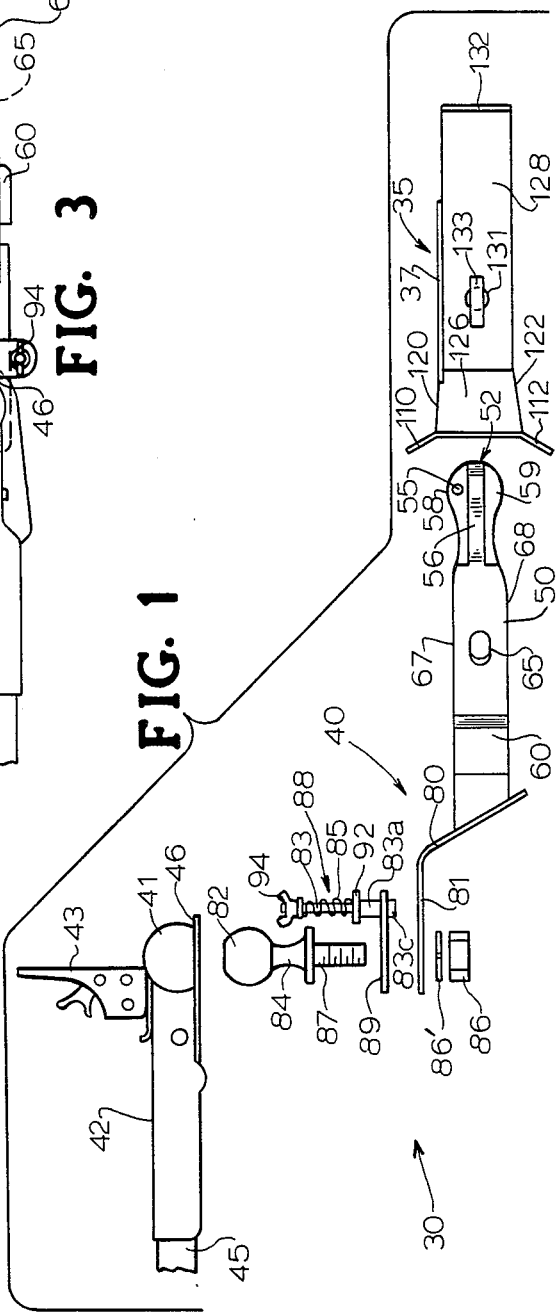

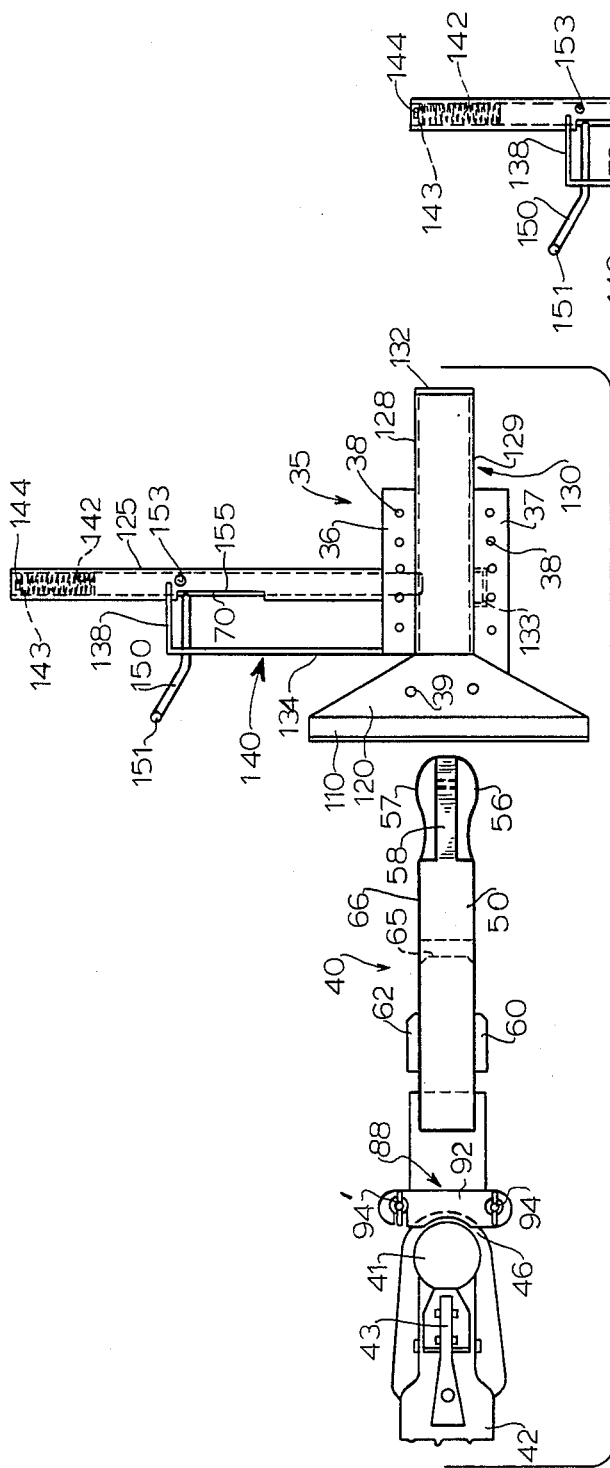
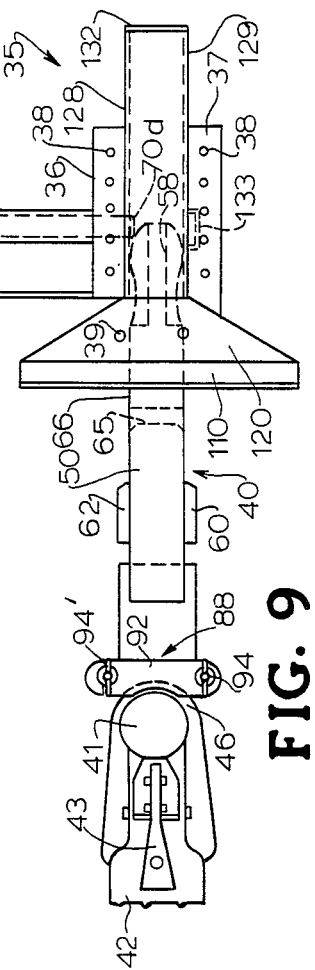
FIG. 8
FIG. 9

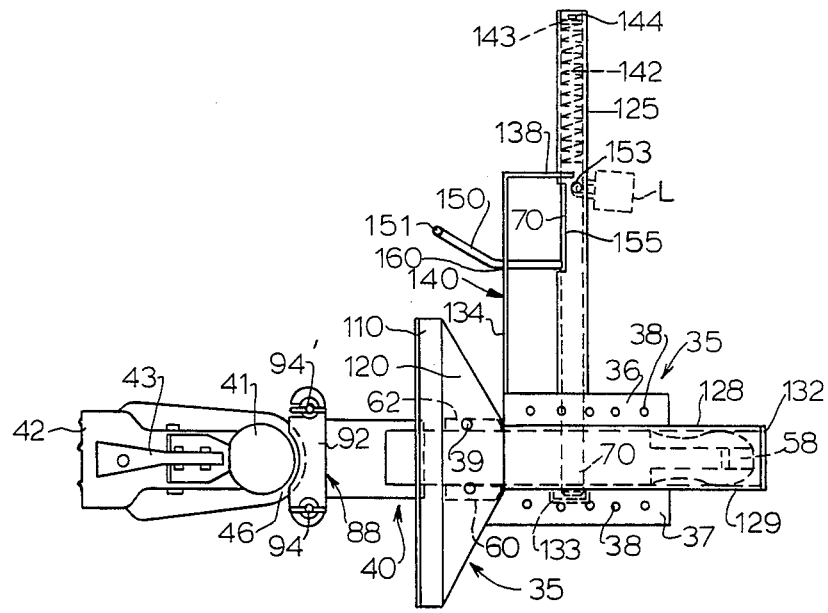
FIG. 10
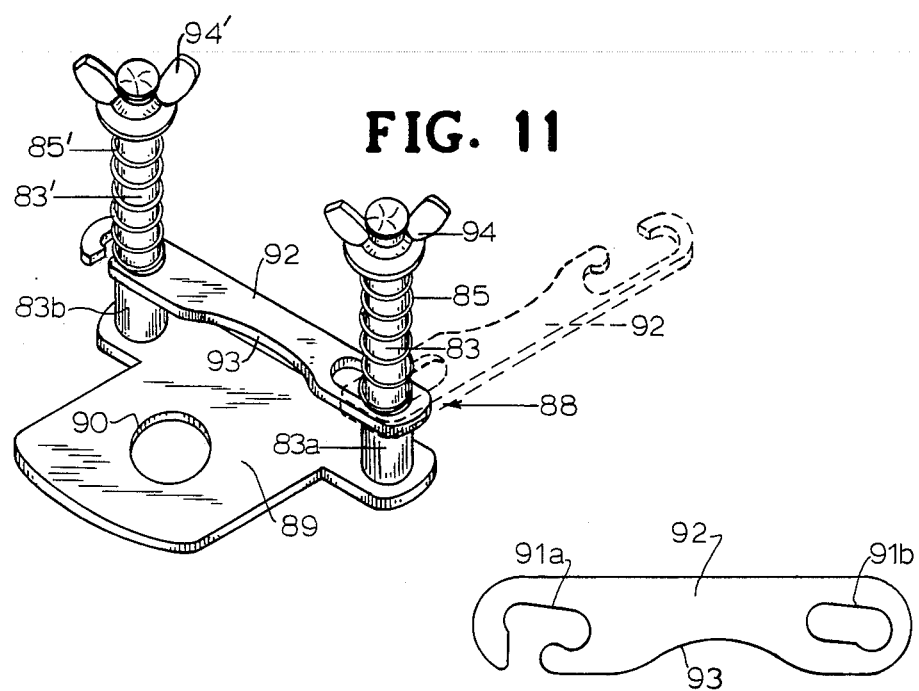
FIG. 11
FIG. 12

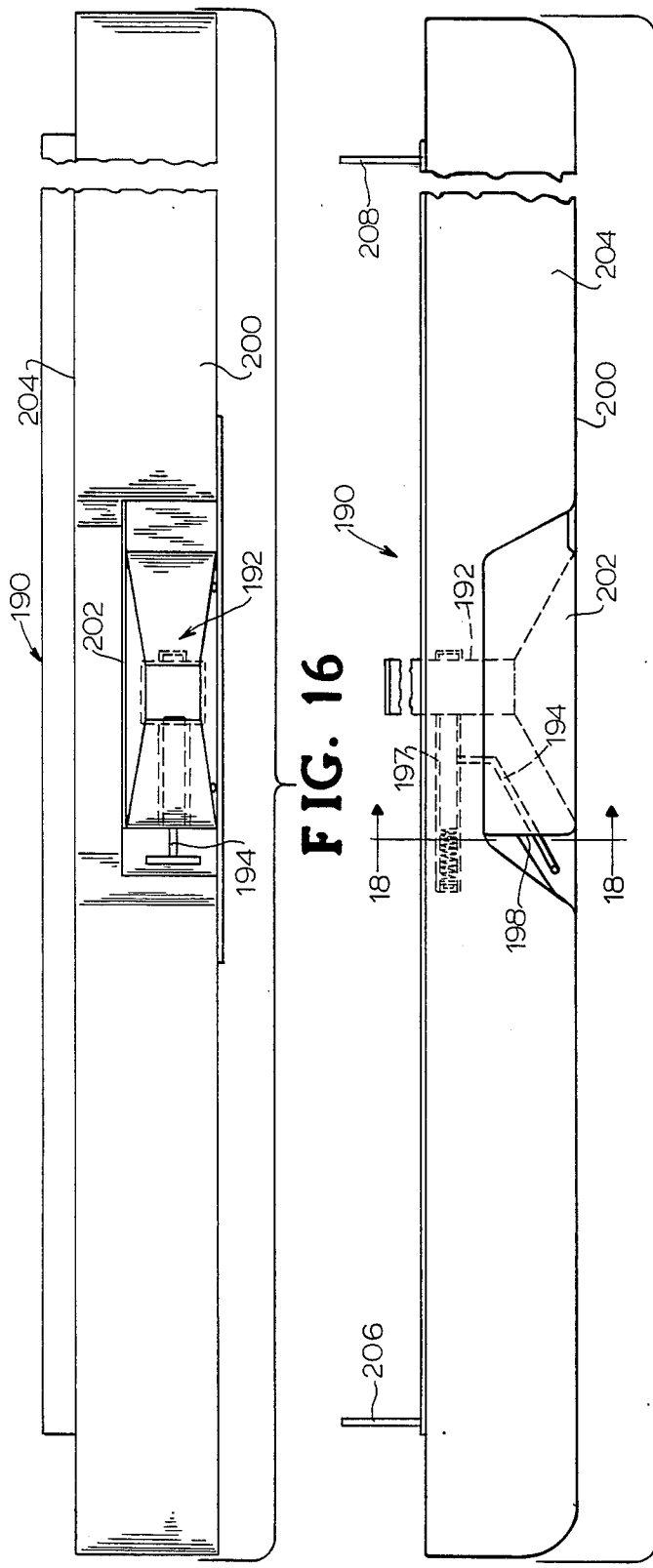
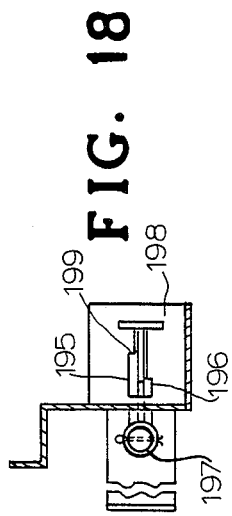
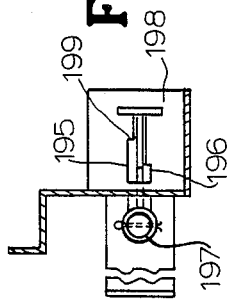
FIG. 16
FIG. 17
FIG. 18

SELF-COUPLING TRAILER HITCH

CROSS-REFERENCE TO RELATED APPLICATION

This application is a continuation-in-part of copending application Ser. No. 674,524, filed Nov. 23, 1984, entitled "Trailer Hitch", and now U.S. Pat. No. 4,560,184.

TECHNICAL FIELD

The present invention relates to trailer hitches and particularly to a trailer hitch which automatically couples a recreational or other type trailer to its towing vehicle.

BACKGROUND ART

The most common hitch employed for securing a recreational trailer to a towing vehicle utilizes a trailer ball mounted on the rear of a towing vehicle releasably coupled to a trailer ball socket housing typically mounted on the trailer tongue. When the trailer is small and of light weight, the job of coupling the trailer to the towing vehicle is easily accomplished simply by moving the trailer to the vehicle. However, when a recreational trailer is itself extremely heavy and particularly when it is carrying a heavy load such as a heavy boat or camper, it is normally not practical to attempt to pull the trailer to the towing vehicle for the purpose of coupling the trailer to the vehicle. Therefore, with heavy trailer equipment, the common practice is to support the tongue with an adjustable jack and maneuver the vehicle until the ball and trailer coupler are aligned and suitably positioned for engagement.

A common practice for aligning a towing vehicle with a detached trailer is for one person to monitor the progress of the vehicle towards the trailer while another person operates the towing vehicle. Another practice has been to attach some type of elevated visible marker to the trailer at the location of the trailer ball to assist the driver of the towing vehicle in aligning the vehicle with the trailer and once aligned the driver alone completes the coupling. Appropriately positioned auxiliary mirrors have also been employed. While it is possible for the vehicle driver to carry out this process alone, engagement under these circumstances is difficult since the vehicle driver is normally required to alternate between operating the towing vehicle and monitoring its progress towards the trailer. It would therefore be desirable to provide a trailer hitch which would enable the driver of the towing vehicle to bring the coupling elements of the vehicle and trailer into coupling alignment and also to automatically couple the towing vehicle with the trailer, once so aligned.

Various attempts have been made in the past to provide an automatic trailer hitch. U.S. Pat. No. 2,062,788 discloses a trailer hitch which requires initial alignment of the coupled parts but which will automatically couple after this initial alignment has been accomplished. There is illustrated a tapered shank with a probe for guiding the shank into the bore of a receiving unit. The shank is mounted on the trailer ball which in turn is mounted on the towing vehicle. The receiving unit is mounted on the trailer. Once the shank has been fully inserted into the receiving unit, it is secured by means of lock dogs.

U.S. Pat. No. 2,671,673 discloses a trailer hitch for use with a farm tractor. The tongue of the towed farm implement mounts a flat shank piece with a hole and the draw bar of the tractor mounts both a receiving unit with a wide mouth ramp for guiding the shank and a spring-loaded locking pin which passes through the hole in the shank to complete the coupling. Since the driver of a farm tractor normally has substantially unobstructed vision of the tractor drawbar, it would appear that the tractor hitch illustrated in U.S. Pat. No. 2,671,673 depends on the mentioned shank and ramp being brought into essentially perfect alignment prior to the described automatic coupling operation. When it is desired to uncouple the hitch described in U.S. Pat. No. 2,671,673, it is also necessary that the coupling pin be manually held in a raised position while the tractor moves forward to disengage the trailer from the tractor.

In U.S. Pat. No. 3,891,237 an elongated shank extends rearwardly from the towing vehicle and has one end formed with a socket secured to a ball mounted on the rear of the towing vehicle. The opposite end of the shank has a notch for entering a bell-shaped flange forming part of a receiving unit secured to the tongue of the trailer. The bell-shaped flange guides the vehicle-mounted shank into the trailer-mounted receiving unit and the notch of the shank is automatically received and interlocked with a spring-loaded pawl to complete the coupling. A bolt is illustrated which is manually passed through mating holes formed in the receiving unit and the shank to complete the coupling. The towing vehicle-mounted shank is positioned on the vehicle by means of a spring supported on the rear of the vehicle. This type of hitch requires the receiving unit to be on the trailer and the pawl to be manually held in a raised position when the towing vehicle and the trailer are uncoupled.

An arrangement known in the prior art for facilitating change of hitch size is a square hollow tube receiver fixed to the towing vehicle in which is received a mating manually-installed removable pin secured shank of square cross-section on which a towing ball of selected size is mounted. The ball socket housing on the trailer is brought to the ball on the pin-secured shank after the shank has been installed in its receiver and the ball and socket housing are aligned to effect coupling in a conventional manner. Therefore, this arrangement does not lend itself to automatic coupling.

The described examples are believed sufficient to illustrate the state of the art prior to applicant's invention of the improved hitch described in copending application Ser. No. 674,524 and the need for an improved automatic trailer hitch useful with a standard modern-type of conventional trailer ball coupler. The invention disclosed in copending application Ser. No. 674,524 provides an improved automatic self-coupling type trailer hitch which: (a) employs a spring-positioned shank on the towed trailer adapted to be detachably secured to but requring no modification of the conventional and widely-used recreational metal-formed trailer ball socket housing; (b) employs a receiver unit on the towing vehicle requiring only a one-time installation modification to the towing vehicle on which the receiver unit is mounted; (c) enables the coupling operation to be completed without requiring precise alignment of the trailer-mounted shank and vehicle-mounted receiving unit; and (d) does not require manual holding or positioning of the coupling pin during either the coupling or uncoupling operation.

While the improved self-coupling trailer hitch disclosed in copending application Ser. No. 674,524 met the objectives set forth above, the present invention seeks to provide even further improvements specifically with regard to an improved spring-loaded locking pin, an improved locking pin support and latching structure, an improved easily removable spring-leveling sub-assembly for the trailer-mounted shank member of the hitch assembly, an improved arrangement on the vehicle-mounted receiving unit for holding the locking pin either fully retracted for withdrawal of the shank and uncoupling of the hitch or partially inserted for the automatic self-coupling operation, and improved means for locking the hitch apparatus, both for safety and anti-theft purposes, and an improved construction in which the improved trailer hitch of the present invention is incorporated as a built-in part of a rear bumper such as used on a truck. The achieving of these improvements thus becomes the principal object of the present invention. Other objects will become apparent as the description proceeds.

DISCLOSURE OF INVENTION

In accordance with the present invention, there is provided a receiving unit mounted on the rear of a towing vehicle and a tapered shank that can be readily attached to the standard coupler ball socket housing on the trailer and which can be guided into the receiving unit for coupling the towing vehicle to the trailer without requiring precise alignment prior to the coupling operation. The receiving unit has a funnel-shaped guide for orienting the leading end of the shank into the bore of the receiving unit when the vehicle is being backed towards the trailer and a spring-loaded locking pin which automatically moves into position to secure the shank within the bore when the coupling has been completed. The locking pin is provided with latching means by which the locking pin can be locked in a position substantially clear of the receiver unit prior to the shank's insertion into the receiving unit but such that the end of the locking pin will be engaged by the shank and will automatically move to a locking position as the shank is guided into a fully-coupled position. The latching arrangement of the present invention also provides means by which the locking pin can be latched in another position such that the locking pin completely clears the receiving unit enabling the hitch to be uncoupled. The shank itself mounts a standard trailer ball at one end so that it can be readily clamped to a standard trailer ball socket housing and utilizes a unique and improved spring-loaded leveling sub-assembly detachably secured by the ball mount and adapted to engage the lip of a standard trailer ball socket housing for holding the shank in a substantially horizontal or other selected position appropriate to automatic coupling.

BRIEF DESCRIPTION OF DRAWINGS

FIG. 1 is an exploded side elevation view of a conventional trailer tongue, ball and ball socket housing with the parts comprising the trailer hitch of the invention.

FIG. 2 is a side elevation view of a partial trailer tongue with an associated trailer hitch ball socket housing assembled with an auxiliary spring-loaded hitch shank member according to the invention with an optional lock indicated in dashed lines.

FIG. 3 is a top plan view of the assembly of FIG. 2.

FIG. 4 is a bottom plan view of the assembly of FIG. 3.

FIG. 8 is a top plan view of the receiving unit about to receive the shank portion of the invention hitch arrangement with the locking pin and lever being shown cocked and ready for activation.

FIG. 9 is a top plan view of the receiving unit with the locking pin being actuated by the leading end of the shank portion.

FIG. 10 is a top plan view of the receiving unit with the locking pin passing through the shank portion and with the lever being in a locked position and with an optional lock shown in dashed lines.

FIG. 11 is a perspective view of the spring-loaded shank leveler sub-assembly of the invention in a first embodiment.

FIG. 12 is a plan view of the leveler assembly clamping member.

FIG. 16 is a front elevation view of a modified step bumper incorporating a modified form of the receiving unit of the invention shown in FIG. 5.

FIG. 17 is a top plan view of the modified step bumper/receiving unit assembly of FIG. 16.

FIG. 18 is a partial section view taken on line 18—18 of FIG. 17.

BEST MODE FOR CARRYING OUT THE INVENTION

Figure 5:
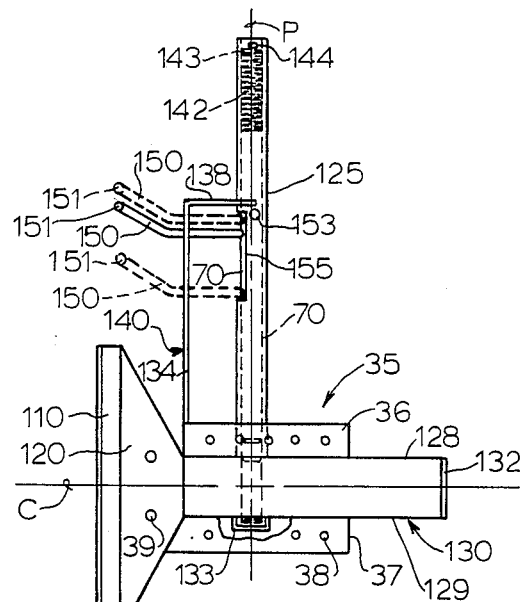
FIG. 5 is a top plan view of the receiving unit of the invention removed from the towing vehicle on which it is mounted with the locking pin and lever arrangement illustrated in solid lines in an open position preparatory to coupling position, in dashed lines in a closed or locked position after coupling and also in dashed lines a fully withdrawn position.
Figure 6:
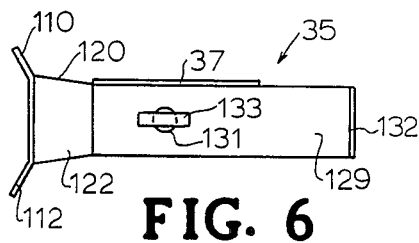
FIG. 6. is a side elevation view of the receiving unit of FIG. 5 removed from the vehicle on which it is mounted.

Making reference initially to FIGS. 1–14, the automatic trailer hitch of the invention, generally designated 30, comprises a funnel-shaped receiving unit 35 fixedly attached to a towing vehicle such as a truck, automobile, or the like, and a shank unit 40 coupled to a conventional ball socket housing 42 mounted on a towed vehicle, such as a recreational boat trailer. Neither the towing vehicle nor the towed vehicle is illustrated for simplification of the drawings. However, it may be noted that the receiving unit 35 includes a pair of metal plates 36, 37 with holes 38 for mounting suitable brackets, not shown, for attaching the receiving unit beneath and to the frame of the towing vehicle. Additional holes 39 enable a bumper bracket, not shown, or the like, to be used for additional securement of the receiving unit 35 to the towing vehicle. Holes 34 receive safety chains. It may be assumed for purposes of the description that the receiving unit 35 is suitably attached to the towing vehicle and that the particular towed vehicle employed mounts a shank unit 40 as illustrated. In use, the uncoupled receiving unit 35 and shank unit 40 shown in FIG. 8, are adapted to be automatically coupled as later explained when the towing vehicle is driven rearwardly to bring the receiving unit 35 into coupling relation with the shank unit 40 as in FIG. 10.

Figure 15:
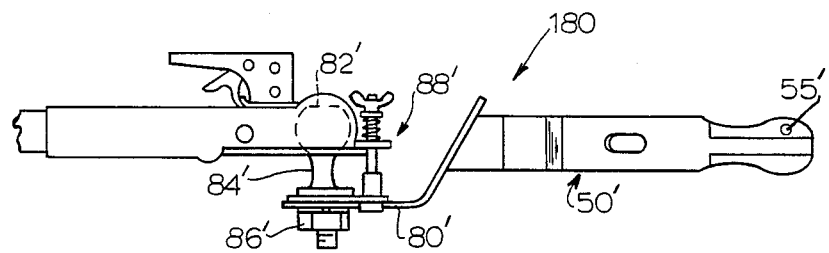
FIG. 15 is a side elevation view of an alternative shank unit for use on a high bumper vehicle.
Figure 19:
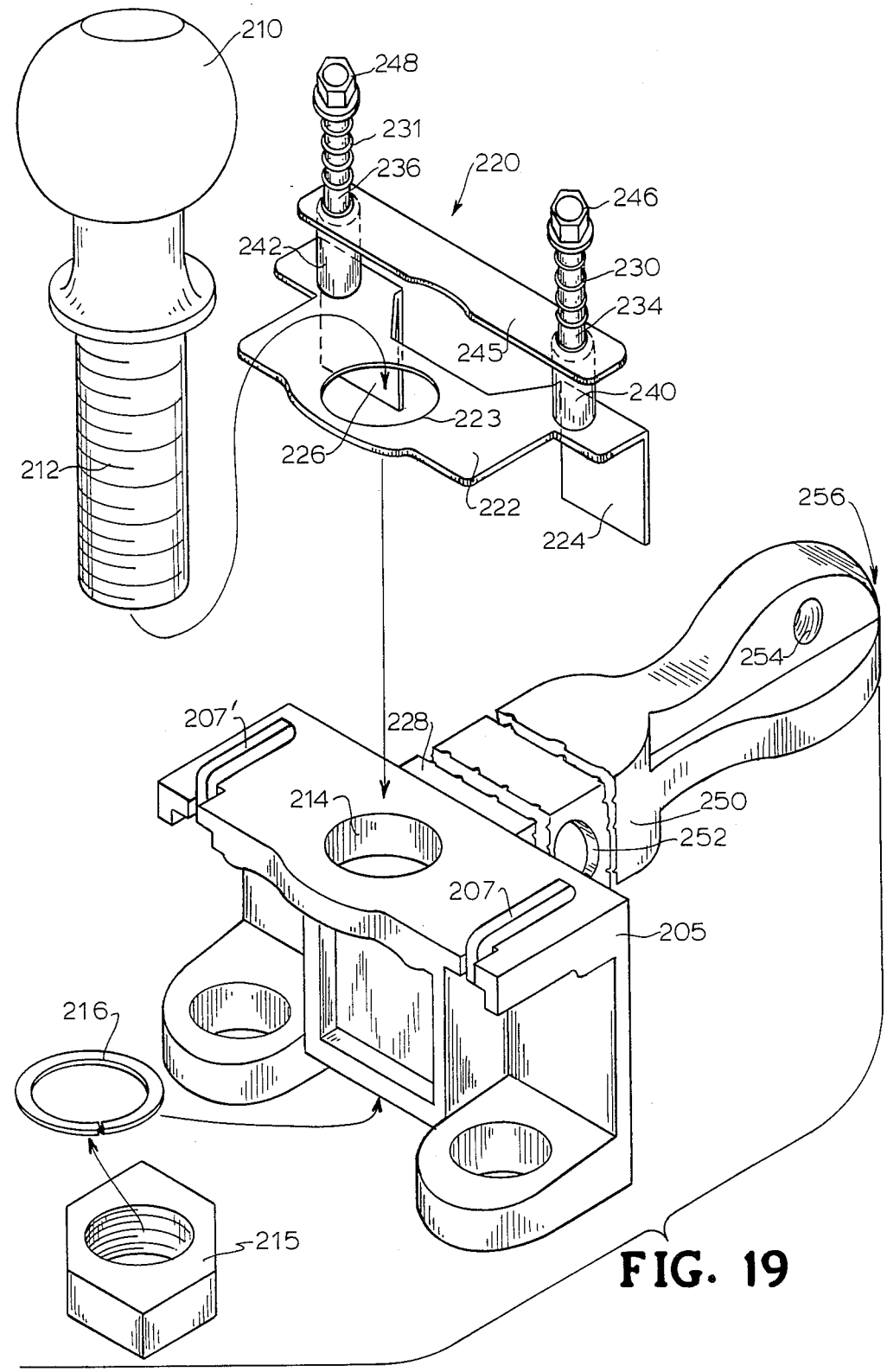
FIG. 19 is an exploded view of a second embodiment modified leveler sub-assembly with a heavy duty hitch shank unit.
Figure 20:
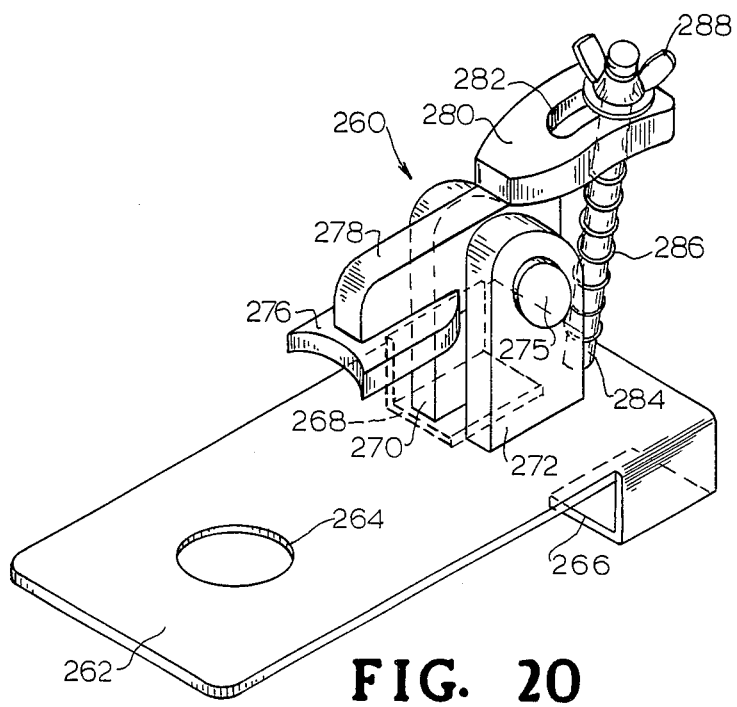
FIG. 20 is a perspective view of a third embodiment leveler sub-assembly.

A first embodiment of the shank unit is illustrated in FIGS. 1–14, a second embodiment in FIG. 15, and a third embodiment in FIG. 19. The receiving unit 35 is illustrated in a first embodiment in FIGS. 1 and 5–10 and in a second embodiment in FIGS. 16–18. The spring leveler sub-assembly is shown in a first embodiment in FIGS. 1–4, 8–12 and 15, in a second embodiment in FIG. 19 and a third embodiment in FIG. 20.

Shank unit 40 comprises an elongated shank 50 formed at its forward end with a rounded probe portion 52 with curved right and left side surfaces formed by ribs 56, 57 and curved top and bottom surfaces formed by ribs 58, 59 to facilitate entry of probe portion 52 into the receiving unit 35. Shank 50 also mounts a pair of opposed stop blocks 60, 62 which serve both to limit the extent of entry of shank 40 into receiving unit 35 and also to accept forces imposed on the hitch during braking of the towing vehicle. The position of stop blocks 60, 62 are also selected to ensure that shank 50, when fully entered into the receiving unit 35, is located in a proper pin-receiving position for coupling. Shank 50 has vertically-disposed side surfaces 64, 66 and horizontally-disposed top and bottom surfaces 67, 68 forward of blocks 60, 62 and which smoothly merge into the respective curved surfaces 56, 57 and 58, 59 to further facilitate entry of the shank unit 40 into and withdrawal from the receiving unit 35. A pin-receiving hole 65 passes through the width of shank 50 for receiving a locking pin 70 (FIG. 5) when shank 50 is fully inserted as later described. Shank 50 may be formed from substantially strong metal tubing or formed as a solid metal piece with stop blocks 60, 62 formed separately and welded or otherwise secured in place or formed integrally with the rest of shank 50.

A bent metal strip ball support 80 secured to the trailing end of shank 50 extends rearwardly and mounts a conventional trailer hitch ball 82 of some selected size by means of its integral ball mount 84 and nut 86 and lock washer 86′ secured on the threaded stud 87. Ball 82 is selected to be of the same size as the socket size of the conventional ball socket housing 42 into which the ball 82 is received. Ball mount 84 in association with stud 87, nut 86 and lock washer 86′ also secures the later described spring leveler assembly 88 on the platform 81 of strip 80.

Ball 82 of the described shank unit 40 mates with and is loosely received by the socket 41 of the conventional type of metal ball socket housing 42 and is retained therein by means of a conventional ball latch 43 as in FIG. 2. Ball socket housing 42 mounts on the end of the trailer tongue 45 as illustrated in FIGS. 1–4 and is characterized by having a forwardly extending ledge 46 which the invention spring-leveler mechanism 88 next described utilizes as a clamping ledge.

With reference particularly to FIGS. 1–4 and FIGS. 8–12, ball support 80 mounts on the horizontal platform portion 81, an upwardly-extending spring leveler sub-assembly 88 comprising plate 89, vertical and laterally spaced bolt members 83 and 83′ having base portions 83c, 83b (see FIG. 4), welded on laterally spaced nuts 83c, 83d and spring-retaining wing nuts 94, 94′. Nuts 83c, 83d extend downwardly from plate 89 and prevent lateral shifting of the sub-assembly 88 on the trailing end of the platform 81. Clamping member 92 formed with a closed slot 91a and an open slot 91b is in use, as in FIG. 2, supported on ledge 46 above the bolt bases 53a, 53b and is tensioned by means of the springs 85, 85′. The amount of the tension is adjustable by loosening and tightening the wing nuts 94, 94′. Plate 89 is formed with aperture 90 for receiving the threaded ball stud 87 and is removably secured on platform 81 by means of nut 86 and lock washer 86′. Thus, the spring leveler assembly 88 can be installed and removed as a unitary assembly. Clamping member 92 has a curved front clamping edge 93 conforming to the curvature of the curved surface of ball socket 41 immediately above the clamped ledge 46. The bottom clamping surface of clamping member 92 mounts a Teflon pad, not shown, or is otherwise treated to reduce the sliding friction between the clamped surface of ledge 46 and the bottom surface of clamping member 92. Spring leveler assembly 88 once installed as illustrated effectively holds shank unit 40 horizontal to facilitate coupling as more fully hereafter explained.

In order to assemble shank unit 40 to the ball socket housing 42 after the spring leveler assembly 88 has been suitably mounted on platform 81 as previously described, the clamping member 92 is slid lengthwise in the slots 91a, 91b and is rotated around bolt member 83 until the lower surface of clamping member 92 is able to engage the ledge 46 of the ball socket 41 of housing 42. At this stage, clamping member 92 is positioned as in FIGS. 2 and 3 and the wing nuts 94, 94′ are suitably tightened which enables the bottom surface clamping member 92 to be forced against and to engage the top surface of ledge 46 under the tension of the springs 85, 85′. Shank unit 40 is then manually positioned to reside horizontally. Springs 85, 85′ then serve to maintain the shank unit 40 extending forwardly from ball socket housing 42 and in the horizontal position in which it was positioned with suitable adjustments being made by loosening and tightening wing nuts 94, 94′ to increase or decrease tension in springs 85, 85′ to achieve the normal horizontal position of shank unit 40 or if desired to achieve a slightly downwardly or upwardly angled position to accommodate to the coupling conditions. Additionally, it will be seen that if an unexpected pressure is applied to shank unit 40 to force it downwardly or upwardly, springs 85, 85′ will tend to restore shank unit 40 to a substantially horizontal position and if otherwise returned to a horizontal position will retain shank unit 40 in such desired horizontal position. The ability of being able to hold shank unit 40 horizontal or near horizontal is of course highly desirable for being able to effect automatic self-coupling of the shank unit 40 and receiver unit 35 and particularly in view of varying coupling conditions. furthermore, the coupling between the ball socket housing 42 and the shank unit 40 is such that during the coupling operation the shank unit 40 can if not precisely aligned with the receiver unit 35 move to the right, to the left, up or down while under tension of the springs 85, 85′ and with clamping member 92 slidably and resiliently engaging the clamping ledge 46 throughout such coupling operation. During travel the hitch of the invention operates advantageously like any conventional ball socket-type hitch. From the description of shank unit 40, the description next turns to a more detailed description of the receiving unit 35.

Receiving unit 35 is secured by suitable bumper and chassis brackets, not shown, to the particular towing vehicle being employed. Since trucks, passenger vans, passenger cars and passenger station wagons vary substantially in the types of bumper and chassis constructions employed and all are employed for towing recreational trailers, it will be understood that the manner of mounting may vary from vehicle to vehicle. Also, the size and shape of the receiving unit 35 may conform to the particular vehicle. The invention also contemplates that the receiving unit 35 may be made a part of a conventional bolt-on under car or under truck receiver or as illustrated in later described FIGS. 17, 18 made part of the rear bumper itself. In use, ball 82 typically resides just behind the rear bumper.

Making reference especially to FIGS. 5–10 and to the construction and operation of receiving unit 35, there is provided an integral funnel-like entry structure for receiving and guiding the probe portion 52 of shank unit 40 comprising upper entry ledge 110, lower entry ledge 112, upper slide wall 120, lower slide wall 122, left slide wall 124, and right slide wall 126. The described entry structure merges into a hollow channel 130 with a locking pin receiving passage 131 defined by opposing holes formed in the side wall 128, 129 of receiver unit 35. Channel 130 is closed by a welded-on end plate 132 and has a cross-sectional shape conforming to the size and cross-sectional shape of probe portion 52 and shank 50 and in the illustrated embodiment has an internal square cross-sectional shape for loosely receiving the mating square cross-sectional external shape of shank 50 in the portion of shank 50 immediately forward of stop blocks 60, 62.

Figure 13:
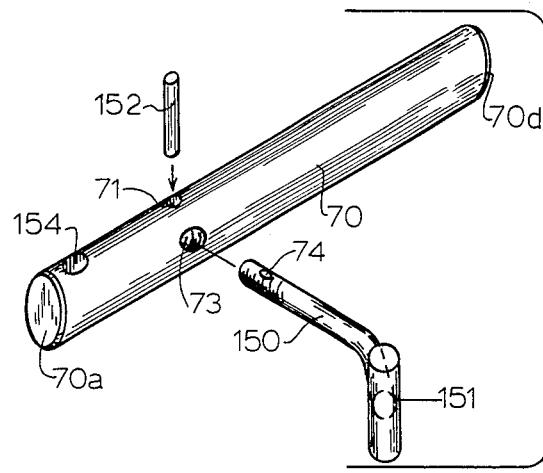
FIG. 13 is an exploded view of the locking pin and operating lever assembly.
Figure 14:
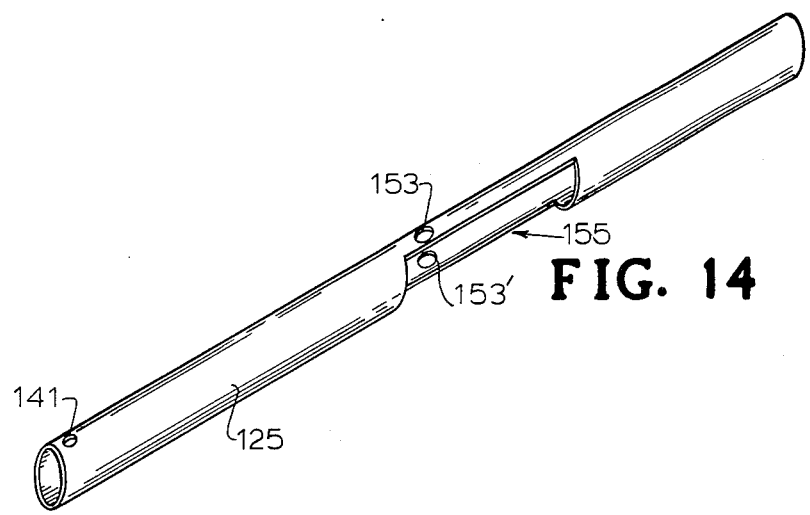
FIG. 14 is a perspective view of the locking pin guide tube.

Locking pin 70 is guided by means of a metal tube 125 formed with slot 155 and welded to one side of channel 130 and having its axis P oriented perpendicular to the channel axis C (see FIG. 5). An L-shaped metal frame 140 extends laterally outwardly from the side wall 128 (FIG. 8) on which pin guide tube 125 is mounted providing side section 134, and end section 138. A compression spring 142 mounts within tube 125 held between the outer end 70a of pin 70 and a thrust washer 143 held by cotter pin 144 mounted in hole 141 of the outer end of tube 125. As best illustrated in FIG. 13, pin 70 is formed as a solid cylindrical member sized to slide freely in tube 125 and is provided with a hole 71 for receiving a drift pin 152 and holes 73, 74 for connecting the locking pin lever 150 to the locking pin 70. To facilitate coupling, when lever 150 is cocked in notch 160 as in FIGS. 7 and 9, the outer end surface 70d of locking pin 70 is tapered so as to ride on the curved surface of rib 57 (FIG. 3) of shank unit 40 when shank unit 40 is being coupled to the receiving unit 35 as in FIG. 9. This arrangement also causes pin 70 to shift outwardly as its end surface rides on rib 57. Such action in turn causes lever 150 to leave notch 160 and to allow pin 70 and lever 150 to move to the fully-coupled position of FIG. 10.

Figure 7:
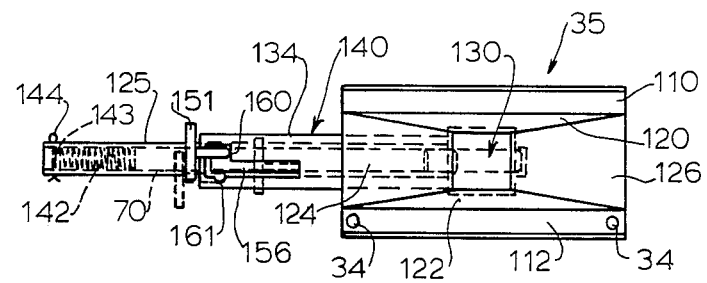
FIG. 7 is a front end elevation view of the receiving unit with the locking pin and lever in a solid line fully withdrawn position, in dashed lines in a closed or locked position and also in dashed lines in a partially withdrawn open position preparatory to coupling.

Lever 150 when released slides back and forth in slot 156 formed in side section 134 of frame 140. Drift pin 152 rigidly connects one end of lever 150 to pin 70 with the opposite end of lever 150 being formed as a T-shaped handle 151. Lever 150 is held in a cocked position for coupling by being placed as indicated in FIG. 7 in the notch 160 extending outwardly from slot 156 formed in section 134 of frame 140. For uncoupling in which the outer end 70d of pin 70 is completely clear of the travel of shank unit 40 on receiver unit 35, lever 150 is cocked in a more outwardly positioned notch 161. Travel of pin 70 is limited both by welded on bracket 133 and by the length of slot 156.

When lever 150 is in the cocked position for coupling, the leading end 70d of pin 70 is located just slightly within the internal passage provided by channel 130 as seen in FIG. 8. The probe portion 52 on shank unit 40 is guided, as the towing vehicle is backed, into the described funnel-shaped entry and works its way into channel 130. When probe portion 52 comes into contact with the slightly protruding end 70d of pin 70 in channel 130, lever 150 is automatically released from its cocked position in upper notch 160 and by means of the tension provided by spring 142 is pressed into sliding contact with the curved side surface of rib 57 and, simultaneously with stop blocks 60, 62 reaching their proper position, pin 70 is mated with the hole passageway 65 passing through shank 50 such that it can become fully engaged as shown in FIG. 10.

In order to uncouple the shank unit 40 from the receiving unit 35, lever 150 is latched in lower notch 161 and is cocked into the uncoupling position illustrated in FIG. 7 in dashed lines which causes pin 70 to be fully retracted and clear of the travel of shank unit 40. As the towing vehicle moves away, the shank unit 40 is freely withdrawn from the receiving unit 35 leaving lever 150 latched in lower notch 161. After the uncoupling is completed, lever 150 may be manually released from lower notch 161 and pin 70 allowed to slide to the FIG. 10 position. A padlock L may be installed in hole 55 as in FIG. 2 to deter theft of a trailer. Padlock L may also be installed through holes 153, 153' in tube 125 and hole 154 in pin 70 when mated in the fully coupled position as in FIG. 10 to deter theft of a coupled trailer or for added security. Holes 153, 153' also facilitate installing and removing drift pin 152.

The elevation above ground of the installed receiving unit 35 will vary with the type towing vehicle on which the receiving unit 35 is installed. Therefore, there is illustrated in FIG. 15 a modified form of shank unit 180 for a relatively high bumper type vehicle. In FIG. 15 the bent metal strip ball support 80' on shank 50' mounts the ball 82' and also secures the spring leveler assembly 88' by means of the ball mount 84' and nut 86'. Hole 55' corresponds to hole 55 of FIG. 2. From prior description and the correspondence of the identified elements in FIG. 15 it will be readily apparent that the FIG. 15 embodiment is installed and operates essentially like the embodiment previously explained.

FIGS. 16, 17 and 18 illustrate a modified step bumper 190 having a receiver unit 192 built into the bumper 190. In this embodiment the operating lever 194 passes through a slot 195 formed in plate member 198 having a notch 196 for fully retracting the spring-loaded locking pin 197 and a notch 199 located to facilitate the previously explained automatic locking action. Bumper 190 has a rear bumper surface 200 modified for receiving the receiver unit 192 below a recessed step 202 formed in the top step 204. Bumper 190 is secured to the vehicle by conventional brackets 206, 208. Since receiver unit is otherwise constructed and operates in the manner previously explained the foregoing description is believed sufficient to illustrate how the receiver unit may be formed as a part of the conventional rear step-type or other type bumper.

FIG. 19 illustrates in an exploded view a heavy duty-type hitch modified according to the invention. The heavy duty ball 210 mounts on threaded stud 212 secured in hole 214 on hitch member 205 by nut 215 and lock washer 216. The spring leveler sub-assembly 220 has a plate member 222 with appended, downwardly extending and laterally spaced arms 224, 226. When assembled, hole 223 in plate member 222 mates with hole 214 in hitch member 205 and plate member 222 mounts between spring bar retainers 207, 207' and is held secured by nut 215 with arms 224, 226 straddling surface 228 to prevent lateral shifting of the plate member 222 on hitch member 205. A pair of springs 230, 231 mount on vertical and laterally spaced posts 234, 236 extending upwardly from base portions 240, 242 secured to plate member 222. Clamping member 245 is tensioned by springs 230, 231 with the amount of tension being contolled by spring retaining nuts 246, 248. Shank 250 is formed with a pin receiving hole 252 and lock receiving hole 254 and rounded probe portion 256. The operation will be as previously explained for other embodiments.

In a still further modification of the spring leveler mechanism, the modified spring leveler sub-assembly 260 is designed for relatively light duty applications and includes a plate member 262. Plate 262 is designed to mount on the support platform 80 of FIG. 1 and incorporates a hole 264 for receiving a ball mount stud as previously explained. Downwardly extending, laterally spaced and opposing L-shaped arms 266, 268 grasp the sides of platform 80 to prevent lateral shifting. A pair of laterally spaced, vertical bracket arms 270, 272 are welded to plate member 262 and receive a pivot pin 275. A lever arm having clamping member 276 for grasping the ball socket housing ledge 46 joins to an intermediate pivoted arm section 278 having a rearwardly extending plate 280. An enlarged hole 282 receives a rod 284 welded to plate member 262 and mounting a spring 286 tensioned by wing nut 288. From prior description, it will be understood that when the spring leveler sub-assembly 260 is installed on platform 80 and clamping member 276 engages housing ledge 46, the sub-assembly operates as previously explained.

From the foregoing, it can be seen that the improved trailer hitch of the invention, in all of the described embodiments, provides at least the following advantages:

(1) Adapts a conventional trailer ball socket coupling to an easily installed and removed automatic hitch without requiring that the trailer coupling be modified.

(2) Operates automatically to couple the trailer and towing vehicle.

(3) Eliminates the need, during the final coupling operation, to either manually align or precisely align the trailer and towing vehicle coupling units to achieve automatic coupling.

(4) Provides a hitch which can be manually latched in a disengaged position on the towing vehicle and then automatically coupled or uncoupled by the driver alone without requiring other assistance.

(5) Provides a hitch which when coupled locates the trailer ball socket housing and the trailer ball immediately adjacent the rear of the towing vehicle for effective weight balance.

(6) Allows the shank unit to be installed in locked position in the receiving unit and have the clamping mechanism removed from the shank unit so as to present a conventional type of vehicle ball mount on the rear of the towing vehicle for conventional non-automatic coupling to the conventional ball socket housing.

(7) Provides means for the shank unit to be moved to some preselected, forwardly-directed position, normally horizontal or near horizontal, to facilitate automatic coupling or the particular coupling condition.

(8) Provides means for distributing the braking load between the locking pin and the stop blocks.

(9) With the shank removed when the trailer is not being pulled, there is essentially no protrusion from the rear of the vehicle as with conventional fixed ball mounts which can easily injure or bruise the leg if accidentally struck.

(10) Provides for handicapped and elderly individuals a means for eliminating the normally heavy lifting and shifting of recreational trailers.

(11) Provides an easily removable, spring-leveler sub-assembly for leveling the shank unit of the invention thus enabling the invention automatic coupling hitch assembly to be quickly converted to a non-automatically coupling and conventional type of hitch simply by installing the invention shank unit in a coupled position, removing the invention leveler sub-assembly and using the ball and socket connection in a conventional way.

(12) By adjusting the tension asserted by the spring leveler sub-assembly allows the shank to be held either horizontal, angled downwardly or angled upwardly to accommodate to a range of coupling conditions.

(13) Allows the conventional ball-socket relation of the coupling to operate in a normal way with the spring leveler sub-assembly installed.

(14) Adapts to both light duty as well as heavy duty hitch requirements.

What is claimed is:

1. An automatic trailer hitch assembly for use with a towing vehicle and a towed trailer or other towed vehicle having a metal-formed housing with a ball socket at its towing end, comprising:
(a) an elongated shank unit on the towed vehicle, said shank unit extending between leading and trailing ends and including:
  (i) at the trailing end a ball member supported on a threaded stud secured to said trailing end and releaseably coupled in the ball socket of said housing;
  (ii) at the leading end curved surfaces facilitating the guidance of said leading end when in contact with guide surfaces; and
  (iii) a leveler assembly mounted on said trailing end comprising:
    (aa) a plate member supported on and releasably secured by said stud to said trailing end; and
    (bb) clamping means supported on and above said plate member and operative for resiliently and slidably grasping a portion of said housing to support said elongated shank unit appropriately positioned for coupling to a receiving unit;
(b) a receiving unit on the towing vehicle having an entry wall portion formed for guiding said leading end and leading therefrom a tubular portion providing a bore for receiving a predetermined length of said shank unit; and
(c) spring-loaded locking means mounted on said receiving unit and having a first cocked position in which said locking means is held latched and sufficiently free of said bore to permit passage of said shank structure unit therein and an uncocked position in which said locking means is unlatched and freed for releasably locking said shank unit and tubular structure together, said shank unit and locking means being operatively associated such that entry of said shank unit into said bore acts to release said locking means from said cocked to said uncocked position.

2. A trailer hitch assembly as claimed in claim 1 wherein said trailing end of said shank unit and said plate member are provided with mating holes in which said ball member threaded stud is received and secured to secure both said ball member and said leveler assembly on said shank structure.

3. A trailer hitch assembly as claimed in claim 1 wherein said spring-loaded locking means is adapted to be placed in a second cocked and latched position to completely free said bore of any obstruction by said locking means therein enabling said shank unit to be freely uncoupled from said tubular structure.

4. A trailer hitch assembly as claimed in claim 1 wherein said receiving unit and said spring-loaded locking means are built into and form part of a rear bumper assembly for the towing vehicle.

5. A trailer hitch assembly as claimed in claim 1, wherein said housing is of the type having a forward ledge portion, said plate member supports spring means and a clamping member spring loaded by said spring means and wherein said clamping member is positioned to grasp said forward ledge portion of said housing.

6. A trailer hitch assembly as claimed in claim 4 in which said locking means includes a tube secured to the side of said tubular portion and whose axis resides perpendicular to the axis of said bore, a locking pin slidable in said tube, a compression spring confined in said tube and engaging an outer end of said locking pin, an operating lever secured to said pin and slidable in a slotted portion of said tube and frame structure with notches for latching said lever in said first and second cocked positions.

7. A trailer hitch assembly as claimed in claim 1 wherein said clamping means are adjustably mounted on and with respect to said plate member enabling the relative positions of said housing and shank unit to be adjusted by adjusting said clamping means.

8. A trailer hitch assembly, comprising:
(a) an elongated shank unit having mounted on its trailing end a trailer hitch ball detachably coupled to a ball socket housing on a towed vehicle, a leading end formed for being guided when engaging guide surfaces, and positioning means detachably secured and supported on said trailing end as a subassembly and operative to hold said shank unit appropriately positioned for coupling to a receiving unit, said trailer hitch ball being mounted on said shank unit by means of a threaded stud and nut and said positioning means subassembly being detachably secured by said stud and nut;
(b) a receiving unit on the towing vehicle having an entry wall portion formed for guiding said shank unit leading end and leading therefrom a tubular portion providing a bore for receiving a predetermined length of said shank structure; and
(c) spring-loaded locking means mounted on said receiving unit and adapted to be placed in a cocked position and in such cocked position to be held latched and sufficiently free of said bore to permit passage of said shank unit therein and also adapted to be placed in an uncocked, unlatched position to move into a position within said bore for releasably locking said shank unit and tubular structure together, said shank unit and locking means being operatively associated such that entry of said shank structure unit into said bore acts to release said locking means from said cocked to said uncocked position.

9. An automatic trailer hitch assembly for use with a towing vehicle and a towed trailer or other towed vehicle having a metal-formed housing with a ball socket at its towing end, comprising:
(a) an elongated shank unit on the towed vehicle, said shank unit extending between leading and trailing ends and including:
  (i) at the trailing end a ball member supported on a threaded stud secured to said trailing end and releasably coupled in the ball socket of said housing;
  (ii) at the leading end curved surfaces facilitating the guidance of said leading end when in contact with guide surfaces; and
  (iii) a leveler assembly mounted on said trailing end comprising:
    (aa) a plate member supported on and releasably secured by said stud to said trailing end and including laterally spaced stop means secured to and extending downwardly from the underside of said plate member for preventing lateral shifting thereof on said shank unit trailing end;
    (bb) said trailing end of said shank unit and said plate member being provided with mating holes in which said ball member threaded stud is received and secured to secure both said ball member and said leveler assembly on said shank structure; and
    (cc) clamping means supported on and above said plate member and operative for resiliently and slidably grasping a portion of said housing to support said elongated shank unit appropriately positioned for coupling to a receiving unit;
(b) a receiving unit on the towing vehicle having an entry wall portion formed for guiding said leading end and leading therefrom a tubular portion providing a bore for receiving a predetermined length of said shank unit; and
(c) spring-loaded locking means mounted on said receiving unit and having a first cocked position in which said locking means is held latched and sufficiently free of said bore to permit passage of said shank unit therein and an uncocked position in which said locking means is unlatched and freed for releasably locking said shank unit and tubular structure together, said shank unit and locking means being operatively associated such that entry of said shank unit into said bore acts to release said locking means from said cocked to said uncocked position.

10. A trailer hitch assembly as claimed in claim 9 wherein said laterally spaced stop means comprise downwardly extending arm members formed as extensions of said plate member.

11. A trailer hitch as claimed in claim 9 including a pair of laterally-spaced bracket arms secured to and extending upwardly from the upper side of said plate member and a shaft mounted on and extending between said bracket arms, said clamping means being mounted on and pivotal about the axis of said shaft.

12. An automatic trailer hitch assembly for use with a towing vehicle and a towed trailer or other towed vehicle having a metal-formed housing with a forward ledge portion and a ball socket at its towing end, comprising:

(a) an elongated shank unit on the towed vehicle, said shank unit extending between leading and trailing ends and including:
  (i) at the trailing end a ball member supported on a threaded stud secured to said trailing end and releasably coupled in the ball socket of said housing;
  (ii) at the leading end curved surfaces facilitating the guidance of said leading end when in contact with guide surfaces; and
  (iii) a leveler assembly mounted on said trailing end comprising:
    (aa) a plate member supported on and releasably secured by said stud to said trailing end;
    (bb) a pair of vertical and laterally-spaced bolts supported on said plate member; and
    (cc) clamping means supported on and above said plate member and operative for resiliently and slidably grasping a portion of said housing to support said elongated shank unit appropriately positioned for coupling to a receiving unit, said clamping means including a clamping member spring-loaded by a pair of springs supported on said bolts, said clamping member being positioned to grasp a said forward ledge portion of said housing;

(b) a receiving unit on the towing vehicle having an entry wall portion formed for guiding said leading end and leading therefrom a tubular portion providing a bore for receiving a predetermined length of said shank unit; and (c) spring-loaded locking means mounted on said receiving unit and having a first cocked position in which said locking means is held latched and sufficiently free of said bore to permit passage of said shank unit therein and an uncocked position in which said locking means is unlatched and freed for releasably locking said shank unit and tubular structure together, said shank unit and locking means being operatively associated such that entry of said shank unit into said bore acts to release said locking means from said cocked to said uncocked position.

* * * * *